United States Patent [19]

Ebbing

[11] Patent Number: 5,282,412
[45] Date of Patent: Feb. 1, 1994

[54] PISTON RING SUBASSEMBLY, ANGULATING PISTON ASSEMBLY AND METHOD OF MAKING SAME

[75] Inventor: David M. Ebbing, Chittenango, N.Y.
[73] Assignee: General Motors Corporation, Detroit, Mich.
[21] Appl. No.: 910,857
[22] Filed: Jun. 30, 1992
[51] Int. Cl.⁵ .............................................. F16J 9/00
[52] U.S. Cl. .................................... 92/240; 92/172; 92/248; 277/181; 277/188 R; 277/189; 29/888.047; 264/275
[58] Field of Search ............... 92/248, 240, 255, 256, 92/257, 258, 172, 241; 277/181, 188 R, 189; 264/275, 279; 29/453, 525, 888.047

[56] References Cited

U.S. PATENT DOCUMENTS

| | | | |
|---|---|---|---|
| 2,558,312 | 6/1951 | Nisbet | 92/257 |
| 3,716,310 | 2/1973 | Guenther | 92/172 |
| 3,861,646 | 1/1975 | Douglas . | |
| 3,885,460 | 5/1975 | Park . | |
| 3,924,968 | 12/1975 | Gaines et al. . | |
| 3,999,894 | 12/1976 | Nakayama et al. . | |
| 4,214,507 | 7/1980 | Hock et al. . | |
| 4,258,927 | 3/1981 | Cather, Jr. . | |
| 4,268,237 | 5/1981 | Wolters . | |
| 4,336,920 | 6/1982 | Murray | 264/275 |
| 4,676,143 | 6/1987 | Nomura et al. . | |
| 4,697,992 | 10/1987 | Hatakeyama et al. | 92/172 |
| 4,738,606 | 4/1988 | Christiansen et al. . | |
| 4,871,181 | 10/1989 | Usher et al. . | |
| 4,972,764 | 11/1990 | Ohya et al. . | |
| 5,022,313 | 6/1991 | Shontz et al. | 92/248 |

FOREIGN PATENT DOCUMENTS

| | | | |
|---|---|---|---|
| 3114286 | 11/1982 | Fed. Rep. of Germany | 92/255 |
| 1133388 | 3/1957 | France | 92/172 |

Primary Examiner—Thomas E. Denion
Attorney, Agent, or Firm—Ronald L. Phillips; Patrick M. Griffin

[57] ABSTRACT

An angulating piston assembly for a vehicle air conditioning system compressor comprises a composite piston including a metal rod having a ball at a proximal end and a plastic head at a distal end. A piston ring subassembly is operatively received about the periphery of the plastic piston head. The subassembly is characterized by a rigid support collar molded into the piston head and a piston ring of low friction material stretched and snugly received over the collar. An integral molded lip on the piston head and an outwardly projecting skirt on the support collar maintain the piston ring in position. An inwardly projecting flange is provided on the support collar and molded into the plastic piston head to provide a lock to prevent relative axial movement between the support collar and the piston head. A method of forming and assembling an angulating piston assembly includes the steps of: 1) mounting the piston ring on the rigid support collar; 2) placing the piston ring subassembly into a mold cavity; 3) positioning a distal end of a piston rod to extend into the mold cavity; 4) closing the mold cavity; 5) injecting molten plastic into the cavity to form the piston head; and 6) separating the mold cavity and removing the assembly.

13 Claims, 2 Drawing Sheets

PISTON RING SUBASSEMBLY, ANGULATING PISTON ASSEMBLY AND METHOD OF MAKING SAME

TECHNICAL FIELD

The present invention relates generally to angulating piston assemblies, such as may be utilized in an automotive air conditioning compressor and, more particularly, the invention relates to an improved piston ring subassembly, an angulating piston assembly utilizing the ring subassembly and a method of producing the same.

BACKGROUND OF THE INVENTION

A variety of refrigerant compressors for use in vehicle air conditioning systems are currently available. One popular vehicle compressor design is the axial type. In this type of compressor, a number of cylinders are equally angularly spaced about and equally radially spaced from the axis of a central drive shaft. A piston is mounted for reciprocal sliding motion in each of the cylinders. The pistons are connected to a swash plate or wobble plate, which is in turn operatively connected to the drive shaft.

During operation of the compressor, rotation of the drive shaft imparts a wave-like reciprocating motion to the wobble plate. This nutating driving action of the wobble plate serves to impart a linear reciprocating motion to the pistons. The pistons serve to compress the refrigerant gas and circulate it through the air conditioning system to cool the air being directed into the vehicle passenger compartment.

The development of a new refrigerant compressor for a vehicle air conditioning system presents unique challenges to an engineer. In recent years, a key objective of automotive air conditioning engineers has been to reduce the size of the compressor as much as possible in order to reduce the overall weight of the vehicle, as well as to lower the cost and to conserve valuable space. It is, of course, also desirable to improve the operating efficiency and quietness of the compressor.

It can be appreciated that substantial momentum forces are capable of being produced in a compressor due to the extreme accelerations imparted to the compressor pistons. Accordingly, if there can be a reduction in the mass of the piston, and a concomitant reduction in the forces generated by the piston action, not only is substantial energy saved (and efficiency increased) due to a reduction in the force required to drive the pistons, but benefits in the other key areas are also gained.

Historically, pistons for axial type compressors have been of unitary construction, machined from a durable metal body, such as a steel alloy. This prior art construction provides the desired strength, but unfortunately has an undesirably high mass. While improvements in hardening and machining techniques have allowed lighter weight metals, such as aluminum alloy, to be substituted, the unitary construction still dictates that a relatively high mass structure be provided.

In recent efforts to address this problem, some progress has been made in producing an improved swash plate compressor piston of composite construction. Others have recognized the main advantage of a composite piston assembly design; that is, a piston capable of operating at extreme accelerations, while minimizing the mass of the assembly and thus reducing the power input required to drive it. This concept is applied to a piston of the rocking or angulating type; that is, the piston head and connecting rod are combined into a single, integral unit, so that during operation the piston assumes a constantly changing, inclined posture relative to the cylinder.

The composite piston of this prior art includes a reinforced plastic piston head that is molded to the distal end of an aluminum shank or piston rod. Various structure is provided to assure a secure connection. Additionally, the proximal end of the rod includes one part of a ball and socket joint providing the connection to the wobble plate of the compressor.

One successful prior art composite piston assembly is illustrated and claimed in co-pending patent application of Shontz, Gavlak and Ebbing, U.S. Pat. No. 5,022,313 issued Jun. 11, 1991, and assigned to the assignee of the present invention.

Thus, while the composite piston assembly represents a significant advance in the art, further improvements are still possible. As one might suspect, the fact that the angulating piston assembly assumes an inclined posture relative to the cylinder bore during piston reciprocation, redesign of the piston continues to be an area where the greatest challenges are present. It is this area where most operational difficulties, mainly sealing problems, can arise. This is especially true under severe service.

The angle of inclination of the piston usually is at a maximum at bottom dead center and becomes approximately zero at top dead center. As mentioned above, as the piston reciprocates between these extreme positions, the angle of inclination is constantly changing. As a matter of fact, this environment and extreme action makes designing a highly efficient piston, and piston ring for effective sealing with the cylinder bore, very elusive.

In the past, especially with respect to angulating pistons of the type described, it is usually necessary to fully machine the piston ring. This is an expensive process as tight tolerances must be maintained in order to provide the required relationship between the piston head and piston ring for proper sealing between the piston head and the cylinder bore.

More particularly, a tight tolerance must be maintained on the outside diameter of the piston ring not only to properly mate with the cylinder, but also so that the ring may be inserted and held firmly in the proper position within the mold cavity for casting of the piston head. The piston ring must also be relatively thick in cross-section so that the ring maintains its annular shape and does not collapse. The additional material that must be utilized to construct this type of prior art ring adds significantly to the overall cost.

Another difficulty in utilizing this type of fully machined piston ring is that it has a tendency to shrink with the molten piston head, as the resin/glass fiber reinforced material forming the head begins to cool in the mold. This disadvantageously results in some variation in the final outside diameter of the piston ring, often resulting in a poor fit within the cylinder bore and a loss in efficiency due to reduced compression of the refrigerant gas.

A need is therefore identified for an improved angulating piston assembly and a new approach to designing the piston ring subassembly for such an angulating piston. Further, a need is also identified for an improved method of forming and assembling an angulating piston assembly, including the novel piston ring subassembly.

SUMMARY OF THE INVENTION

Accordingly, it is a primary object of the present invention to provide an improved angulating piston assembly and piston ring subassembly of simplified construction while also providing an improved method for forming the same.

Another object of the present invention is to provide an angulating piston assembly and method of production substantially eliminating material waste and the need to machine the piston ring subassembly so as to significantly reduce both material and production costs.

Still another object of the invention is to provide a piston ring subassembly for an angulating piston that is strengthened for improved service, but also utilizes a relatively inexpensive piston ring; the ring being cut from a tube of low friction material, such as polytetrafluoroethylene, and stretched onto an annular metal collar.

Yet another object of the invention is provide an angulating piston assembly with a piston ring subassembly of improved geometry, providing full circular contact for better sealing with the cylinder bore at all inclinations of the piston assembly during reciprocation within the cylinder bore. Accordingly, full design compression is maintained at all times and at all points in the reciprocation cycle for maximum operating efficiency of the compressor.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention as described herein, an improved angulating piston assembly is provided for a vehicle air conditioning system compressor. The angulating piston assembly includes a composite piston wherein the piston head and connecting rod are formed into a single, integral unit. More particularly, the composite piston includes a lightweight piston rod of metal, such as aluminum alloy having a hardened steel ball at a proximal end for connection to a corresponding socket on a wobble plate of the compressor, and a fiberglass-reinforced plastic head at a distal end for receipt within the cylinder bore of the compressor. The piston assumes an inclined posture relative to the cylinder bore during piston reciprocation. The angle of inclination of the piston assembly constantly changes and is at a maximum at bottom dead center, and becomes zero at top dead center so as to provide minimum head clearance and maximum volumetric efficiency.

A piston ring subassembly is operatively received about an outer circumferential periphery of the plastic piston head. The piston ring itself may be made from a wear resistant, low friction elastomeric material, such as mineral or graphite filled polytetrafluoroethylene (PTFE). The piston ring is designed to be fixed to the piston head so as to provide a high quality sealing fit in the cylinder bore. The objective is to provide the desired full compression during piston reciprocation. Advantageously, the low friction property of the ring also helps the compressor operate at maximum efficiency by significantly reducing the overall friction forces in the compressor.

The piston ring subassembly is characterized by a metal, preferably steel, support collar or sleeve that is molded into the piston head. The piston ring is snugly stretched over and firmly seated on this collar. More particularly, the piston ring is positioned between an outwardly projecting skirt along one side of the support collar and a molded annular lip on the plastic piston head. Adjacent the lip there is an inwardly turned flange on the piston ring. Together, the molded lip, the flange and the projecting skirt form a strong connection. An annular channel for locking the piston ring in position is formed between the skirt and lip.

The outer face of the collar is curved to form a spherical section. When assembled on the collar, the outer curved face of the piston ring thus defines a spherical section also; the ring diameter slightly exceeding the diameter of the cylinder bore. This interference fit is eliminated in a final sizing operation wherein the piston ring is plastically deformed to snugly fit the cylinder bore. Advantageously, the resulting ring geometry allows pressure to be sealed via circular line contact with the cylinder bore at any angular inclination of the piston relative to the bore axis during reciprocation. Accordingly, compressor operation at the designed relatively high compression, so as to provide maximum pumping efficiency, is assured at all times.

The inwardly projecting flange on the support collar by being molded into the plastic piston head fixes the collar against axial movement. Accordingly, the relative axial position between the support collar and the plastic piston head is effectively securely locked into an integral structure, and the strength and structural integrity of the overall assembly is greatly enhanced.

In accordance with a further aspect of the present invention, a method of forming and assembling the angulating piston assembly is provided. As defined above, the angulating piston assembly is made up of two components: namely, the composite piston, and the piston ring subassembly that includes a rigid annular support collar and a stretched piston ring on the collar. The unique method required to best make this assembly includes an initial step of mounting the piston ring on the support collar. More particularly, this is done by cutting or skiving an elastomeric ring of desired width from an extruded tube of mineral or graphite filled PTFE. This ring is then stretched and slid onto the support collar. A tapered mandrel may be used in a manner known in the art. When properly mounted, the leading edge of the stretched ring abuts against the outwardly projecting skirt discussed above.

The next step is the placement of the piston ring subassembly into one half of a mold cavity for forming the molded head of the composite piston. Advantageously, the support collar is sufficiently rigid (preferably formed steel) to maintain the shape and position of the piston ring within the mold. After positioning a distal end of a piston rod so as to properly extend into the same half of the mold cavity, the other half of the mold is closed to fully capture the piston ring subassembly and the rod. The next step is to inject the molten high temperature, high strength glass-reinforced resin, such as nylon or high density polyethylene, into the cavity in order to form the piston head.

As the injected resin begins to cool, the rigid support collar continues to support the piston ring, thereby guarding against any tendency to shrink. This assures that the desired peripheral expanse of the piston ring is maintained for proper sealing engagement with the internal wall of the cylinder bore upon incorporation into a compressor. After sufficient cooling, the operator proceeds to open the mold cavity and removes the completed piston assembly.

In accordance with the more detailed aspects of the inventive method, there is included the step of molding the integral retaining lip into the piston head. The lip engages the trailing edge of the piston ring providing axial retention in this direction in the same manner as the outwardly projecting retaining skirt on the support collar retains the ring in the leading direction. Thus, together, the molded retaining lip, the outer face of the spherical section of the collar and the outwardly projecting retaining skirt, form the complete annular channel in which the piston ring is held and secured. Still further, the spherical outer face may include a roughened, knurled or otherwise upset finish to improve ring retention, and thereby ensure that the piston ring is maintained in a stabilized condition within the channel at all inclinations of the piston assembly, as it reciprocates within the cylinder bore of the compressor.

Subsequent to the forming of the angulating piston assembly, the steps of sizing of the piston ring by placement in the cylinder bore of a compressor is performed. More particularly, the piston ring is squeezed to provide plastic deformation. The small, built-in interference fit with respect to the bore is thus removed. Subsequent to placement within the cylinder bore, the elastomeric ring, by its inherent elastic memory, expands to maintain its snug, fully sealed fit in the cylinder.

Advantageously, it should be appreciated that the outwardly projecting retaining skirt of the support collar has sufficient strength to withstand the excessive axial, as well as the lateral Poisson stresses produced along the leading edge of the piston during the plastic deformation. Similarly, the molded integral retaining lip of the piston head is also able to withstand these forces. The gusset-ribbing of the head provides added strength in the latter direction. As a result of this unique arrangement, there is substantial elimination of any possibility of damaging or cracking the piston head. This is especially important during the sizing step when both axial and lateral stresses are the greatest.

Still other objects of the present invention will become apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWING

The accompanying drawing incorporated in and forming a part of the specification, illustrates several aspects of the present invention and together with the description serves to explain the principles of the invention. In the drawing.

Reference will now be made in detail to the present preferred embodiment of the invention, an example of which is illustrated in the accompanying drawing.

DETAILED DESCRIPTION OF THE INVENTION

Figure 1:
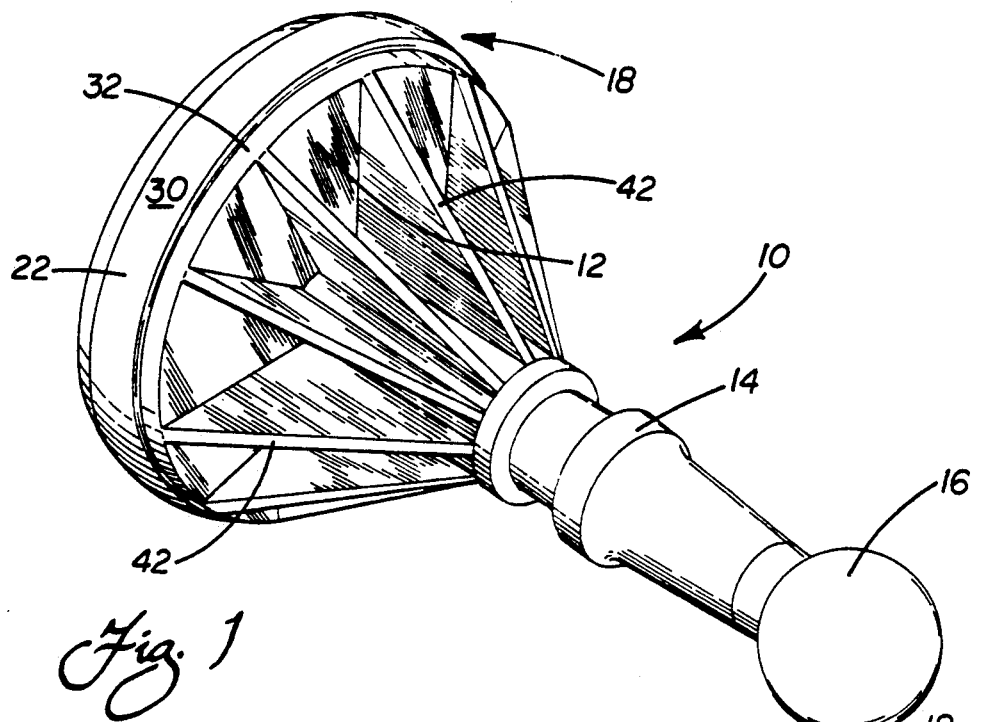
FIG. 1 is a perspective view of the angulating piston assembly of the present invention.

Reference is now made to the drawing figures and particularly FIG. 1 showing the improved angulating piston assembly 10 of the present invention. It should be recognized that the piston assembly 10 is of a composite construction including a piston head 12 of a high temperature resistant, high-strength resin of a type known in the art, such as nylon or high density polyethylene. This piston head 12 is molded to the distal end of a high strength aluminum alloy connecting rod 14. The distal end of the connecting rod 12 has a slight reverse taper and also includes a knurled surface to provide additional security to the connection (see FIG. 2).

The piston assembly 10 further includes a hardened steel ball 16 mounted to the proximal end of the connecting rod 14. The ball 16 is adapted for connection to a socket on the wobble plate of the compressor. For additional details of the basic vehicle air conditioning system compressor for refrigerant, reference is made to, for example, U.S. Pat. No. 4,815,358 to Smith, issued Mar. 28, 1989, and entitled "Balanced Variable Stroke Axial Piston machine". This patent is assigned to the assignee of the present invention.

More specifically, an angulating piston assembly 10 of the present invention may be substituted for each of the translating piston assemblies disclosed in this patent. Unlike translating piston assemblies, angulating piston assemblies combine the piston head 12 and connecting rod 14 into a single unit. Accordingly, the piston assembly 10 must assume an inclined posture relative to the cylinder bore in which it reciprocates. This angle of inclination usually is a maximum at a bottom dead center and becomes zero at top dead center. In this way minimum head clearance and maximum volumetric efficiency are provided.

Figure 3:
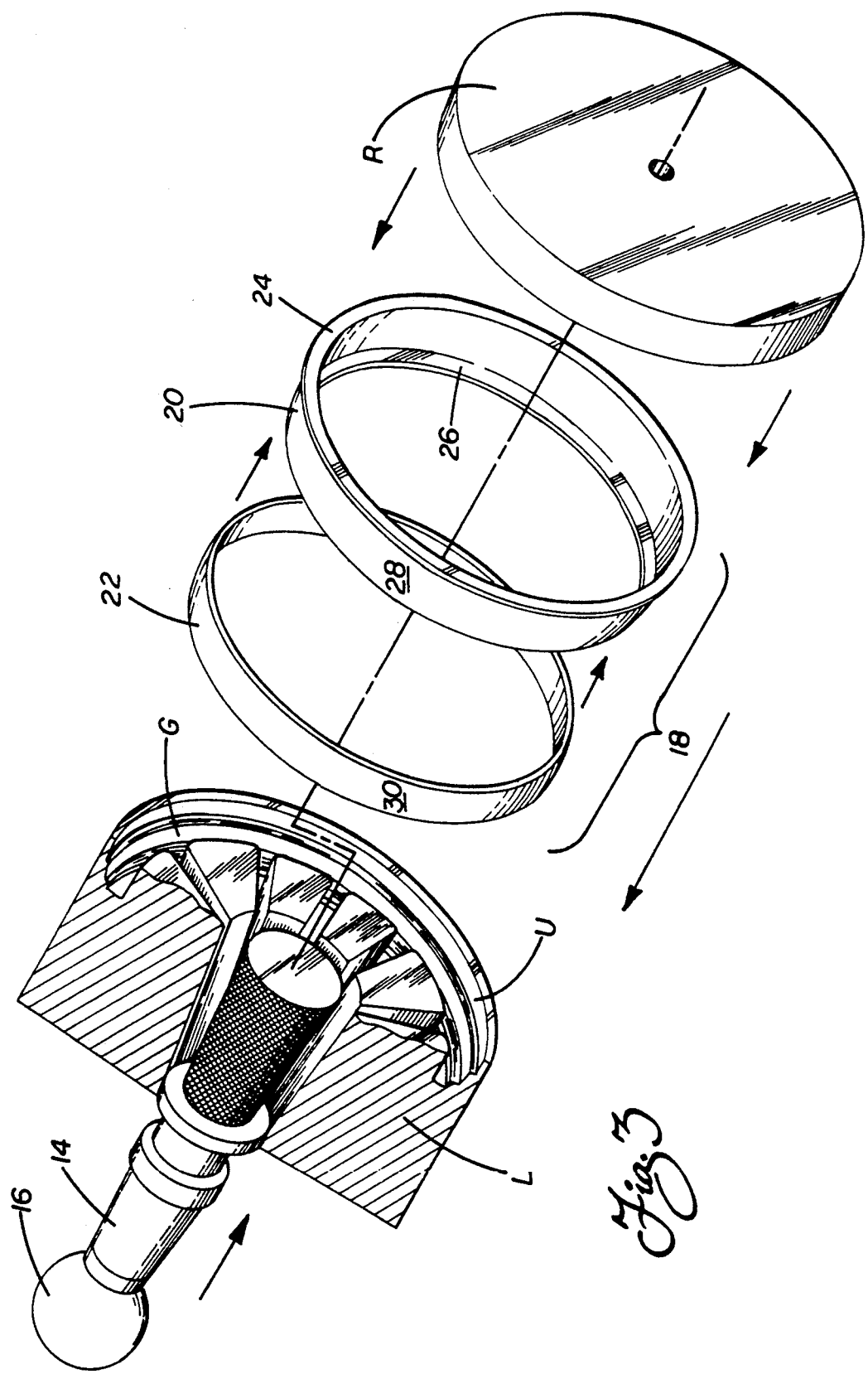
FIG. 3 is an exploded perspective view (partially broken away for clarity) of the piston ring subassembly and the angulating piston. Assembly of the present invention, also illustrating the method of forming the assembly in the mold.

A piston ring subassembly, generally designated by reference numeral 18, is provided around the periphery of the fiberglass-reinforced piston head 12. More particularly, as shown in FIG. 3, the piston ring subassembly 18 includes a relatively rigid, annular support collar 20, fabricated of a suitable metal, such as steel, and a piston ring 22 formed of mineral or graphite filled PTFE. As is known in the art, the piston ring 22 is designed to provide a snug fit with the wall of the cylinder bore in which the piston assembly 10 reciprocates. This fit provides and is designed for tight sealing to maintain compression during compressor operation. Further, the low friction material ensures that frictional forces within the compressor are minimized for best operating efficiency and a long service life.

Figure 2:
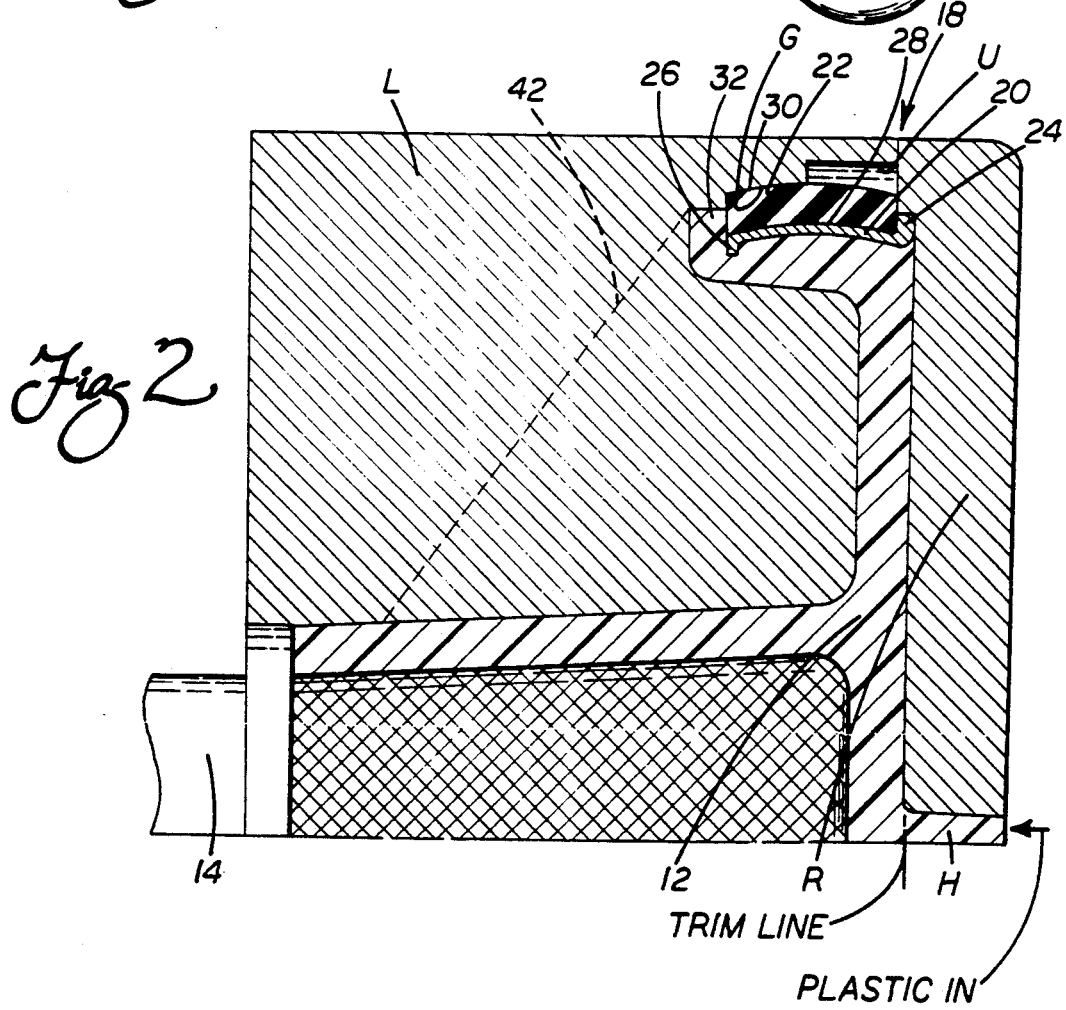
FIG. 2 is a detailed, fragmentary cross-sectional view of the angulating piston assembly of the present invention, held within a mold cavity for forming the piston head, illustrating the method of forming the assembly of the present invention.

As described in greater detail below, the piston ring subassembly 18 is molded to the piston head 12. A sectional view of the piston ring subassembly 18 and its connection to the piston head 12 is shown in FIG. 2. The support collar 20 includes an outwardly projecting annular retaining skirt 24 at the leading edge (in the direction of compression) and an inwardly projecting flange 26 at the opposite or trailing edge (see also FIG. 3). A spherical section outer face 28 of the support collar 20 extends between the retaining skirt 24 and flange 26. Thus, when properly positioned on the support collar 20, the piston ring 22 overlies the outer face 28 and abuts against the projecting retaining skirt 24. As the piston ring 22 is resilient and flexible, the outer face 30 of the piston ring thus assumes the spherical section configuration. As described in greater detail below, this spherical configuration provides excellent sealing action with the wall of the cylinder bore during piston reciprocation throughout the entire range of inclination, as the piston assembly 10 moves between the bottom dead center and top dead center positions.

As should be appreciated from viewing FIGS. 2 and 3, the piston head 12 is molded within the confines of the piston ring assembly 18. Accordingly, the inwardly projecting, annular flange 26 of the support collar 20 is molded in place to provide a rigid connection or mechanical lock to prevent the support collar 20 from relative axial movement with respect to the piston head 12.

The piston head 12 includes an integrally molded, annular lip 32 that projects radially outward to the same extent as the retaining skirt 24 (see FIGS. 1 and 2). Together, the molded lip 32, retaining skirt 24 and spherical outer face 28 form an annular channel that secures the piston ring 22 in position on the support collar 20. Piston ring retention may be still further improved by providing the curved outer face 28 with knurling or other pattern.

The method of forming and assembling the angulating piston assembly 10 of the present invention will now be described in detail. As indicated above, the angulating piston assembly 10 includes a composite piston, having a plastic piston head 12 and an aluminum alloy connecting rod 14, and a piston ring subassembly 18 including a rigid support collar 20 and piston ring 22. Initially, the piston ring 22 is skived or cut to the desired width from a tube of mineral or graphite filled PTFE. The piston ring 22 is then stretched over a tapered mandrel (not shown) and mounted so as to overlie the spherical outer surface 28 and abut against the retaining skirt 24 of the support collar 20 (note action arrows in FIG. 3).

The resulting piston ring subassembly 18 is then positioned in the left mold portion L of a two-piece injection mold for forming the piston head 12. More specifically, the subassembly 18 is positioned so as to abut and be retained within the groove G. An annular undercut forward of the groove G (see FIGS. 2 and 3) is provided to allow limited, resilient displacement of the ring 22 adjacent the other mold portion R. Advantageously, the relatively rigid support collar 20 ensures that the piston ring subassembly 18 is self-supporting and maintains its shape as the subassembly is positioned and rests in the mold.

Next, the distal end of the connecting rod 14 is properly positioned so as to extend into the mold cavity. The mold cavity is then closed by bringing the right mold portion R into mating position with the left portion L (see FIG. 3). The molten high strength glass-filled resin is then injected into the combined mold portions L, R through an injection passage H so as to form the molded piston head 12. As this is done, the molded lip or shoulder 32 is formed along the trailing edge of the piston ring 22, and the inwardly projecting flange 26 is firmly imbedded in the resin to actually secure the piston ring assembly 18 in position. Advantageously, the relatively rigid steel support collar 20 ensures that the piston ring 22 maintains the desired diametrical dimensions and shape. More particularly, it must be appreciated that the piston ring 22 softens due to the heat from the injection molding process. As the resin and piston ring 22 cool, the rigid support collar 20 prevents the diameter of the piston ring 22 from changing, even though the piston head 12 may shrink a minute amount.

After sufficient cooling, the left and right portions L, R of the mold are separated and the piston assembly 10 is removed.

The final step prior to assembling the angulating piston assembly 10 into the cylinder bore of a compressor is a sizing operation. More particularly, the piston ring 22 is initially dimensioned so that the final outside diameter slightly exceeds the diameter of the cylinder bore into which the angulating piston assembly 10 is to be positioned. Accordingly, there is a small built-in interference fit in the bore to allow for tolerance stackup. This interference is eliminated in this final sizing operation so that the piston ring 22 fits snugly in the cylinder bore.

More particularly, the piston ring 22 is radially squeezed so as to be plastically deformed and inserted into the cylinder bore. The piston ring 22 then expands a small amount due to resilient memory to provide a well-controlled snug fit. Further, as a result of the spherical support provided by the outer surface 28 of the collar 20, an appropriate spherical section geometry is provided on the face 30 of the piston ring 22 to provide sealing within the cylinder bore via the desired circular line contact. This contact is maintained at any angular inclination of the piston assembly 10 relative to the cylinder bore axis as the piston assembly reciprocates between top dead center and bottom dead center positions. Accordingly, good sealing for proper compression is maintained throughout the operating cycle of the piston assembly 10.

During the final sizing operation, it should be appreciated that the plastic deformation causes excessive lateral Poisson stresses within the piston ring 22 that act on the retaining skirt 24 and integral molded lip 32. Advantageously, the steel retaining skirt 24 inherently has sufficient strength to withstand these forces along the leading edge of the piston. In contrast, in prior art piston designs, the piston head 12 is molded with an integral leading edge lip of plastic instead of this novel high strength, steel retaining skirt. Accordingly, this problem is solved by this important feature of the present design.

The integral molded lip 32 of plastic at the trailing edge of the piston ring 22 also has sufficient strength to withstand the stresses of the sizing operation. More particularly, it should be appreciated that the molded lip 32 is reinforced and supported by an array of gussets 42 that is an integral part of the piston head design. Thus, structural failures adjacent both edges resulting from the sizing operation, as well as from later compressor operation, even under severe conditions are essentially avoided.

In summary, numerous benefits result from employing the concepts of the present invention. The piston ring subassembly 18 is of relatively simplified construction and allows the utilization of skived or cut piston rings. Advantageously this significantly reduces material costs and eliminates machining costs associated with piston rings utilized in prior art angulating piston assembly designs. Additionally, it should be appreciated that the piston ring subassembly 18 of the present invention provides a very secure attachment to the piston head 12, as well as a piston ring 22 of improved overall spherical section geometry. Full circular contact is provided between the curved face 30 of the piston ring 22 and the cylinder bore for better sealing at all inclinations of the piston assembly 10 during reciprocation. Further, it should be appreciated that through the provision of the metal support collar 20 having an integral, outwardly projecting retaining skirt 24 for engaging the leading edge of the piston ring 22, and a retaining flange 26 adjacent the trailing edge, as well as the lip 26, an overall assembly of higher integrity and strength is assured.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as is suited to the particular use contemplated. All such modifications and variations are within the scope of the invention as determined by the appended claims when interpreted in accordance with breadth to which they are fairly, legally and equitably entitled.

We claim:

1. An angulating piston assembly for a vehicle air conditioning system compressor, comprising:
   a composite piston including a metal rod having connecting means at a proximal end and a molded plastic head at a distal end; and
   a piston ring assembly operatively received about the periphery of said plastic head, said piston ring assembly being characterized by:
   an annular, substantially rigid support collar molded into said piston head;
   a piston ring of low friction material received on said collar; and
   means for maintaining said piston ring on said support collar.

2. The angulating piston assembly of claim 1, wherein said support collar is formed from metal and is interdisposed between said piston ring and said molded plastic head.

3. An angulating piston assembly for a vehicle air conditioning system compressor, comprising:
   a composite piston including a metal rod having a connecting ball at a proximal end and a molded plastic head at a distal end; and
   a piston ring assembly operatively received in a groove about the periphery of said plastic head, said piston ring assembly being characterized by:
   a separate annular, substantially rigid support collar molded into said piston head;
   an elastomeric piston ring of low friction material stretched and snugly received over said collar; and
   means for maintaining said piston ring on said support collar including an outwardly projecting skirt at a first edge of said piston ring and a molded lip on said plastic head engaging a second, opposite edge of said piston ring.

4. The angulating piston assembly of claim 3, wherein said support collar further includes an inwardly projecting flange adjacent the second edge of said ring molded into said plastic head for preventing relative axial movement between said support collar and said plastic head.

5. The angulating piston assembly of claim 4, wherein said support collar includes a spherical section extending between said outwardly projecting skirt and said inwardly projecting flange and upon which said piston ring is received and held.

6. The angulating piston assembly of claim 4, wherein said first edge is the leading edge of said piston ring and the second edge is the trailing edge in the direction of the compressing action, and an array of gussets on said piston extending outwardly adjacent said trailing edge of said piston ring.

7. A angulating piston assembly of claim 3, wherein said support collar is formed from metal and is interdisposed in the groove between said piston ring and said molded plastic head.

8. A method of forming and assembling an angulating piston assembly including a composite piston, a rigid support collar in a groove and a piston ring, comprising the steps of:
   mounting said piston ring on said rigid support collar;
   placing said support collar and piston ring into a mold cavity;
   positioning a distal end of a piston rod to extend into said mold cavity;
   closing said mold cavity so as to fully capture said support collar, piston ring and distal end of said rod;
   injecting molten plastic into said cavity to form a head of said composite piston on said distal end of said rod; and
   separating said mold cavity and removing said angulating piston assembly.

9. The method of forming and assembling an angulating piston assembly as set forth in claim 8, wherein said mounting step includes stretching said piston ring over said support collar and abutting a first edge of said piston ring against an outwardly projecting retaining skirt on said support collar.

10. The method of forming and assembling an angulating piston assembly as set forth in claim 8, including molding an integral retaining lip in said piston head for engaging a second, opposite edge of said piston ring.

11. The method of forming and assembling an angulating piston assembly as set forth in claim 8, including providing said support ring with a spherical section for receiving said piston ring.

12. The method of forming and assembling an angulating piston assembly as set forth in claim 10, including an additional step of sizing said piston ring for receipt in a cylinder bore of a compressor.

13. A method of forming and assembling an angulating piston assembly including a composite piston and a rigid support collar with a piston ring, comprising the steps of:
   placing said support collar and piston ring into a mold cavity;
   positioning a distal end of a piston rod to extend into said mold cavity;
   closing said mold cavity so as to fully capture said support collar and the distal end of said rod;
   injecting molten plastic into said cavity to form a head of said composite piston on said distal end of said rod; and
   separating said mold cavity and removing said angulating piston assembly.

* * * * *